US009503926B2

(12) United States Patent
Kruys et al.

(10) Patent No.: US 9,503,926 B2
(45) Date of Patent: Nov. 22, 2016

(54) DISTRIBUTED BI-DIRECTIONAL FLOW CONTROL IN WIRELESS MESH NETWORKS

(71) Applicant: Cisco Technology, Inc., San Jose, CA (US)

(72) Inventors: Johannes Petrus Kruys, Harmelen (NL); Lu Qian, Solon, OH (US); Predrag Tosic, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/925,294

(22) Filed: Oct. 28, 2015

(65) Prior Publication Data

US 2016/0050582 A1     Feb. 18, 2016

Related U.S. Application Data

(63) Continuation of application No. 12/114,822, filed on May 5, 2008, now Pat. No. 9,215,620.

(51) Int. Cl.
| *H04L 12/827* | (2013.01) |
| *H04W 28/02* | (2009.01) |
| *H04L 12/801* | (2013.01) |
| *H04L 12/803* | (2013.01) |
| *H04L 12/825* | (2013.01) |
| *H04L 12/835* | (2013.01) |
| *H04W 28/12* | (2009.01) |

(52) U.S. Cl.
CPC ............ *H04W 28/021* (2013.01); *H04L 47/11* (2013.01); *H04L 47/125* (2013.01); *H04L 47/14* (2013.01); *H04L 47/25* (2013.01); *H04L 47/263* (2013.01); *H04L 47/30* (2013.01); *H04L 47/33* (2013.01); *H04W 28/12* (2013.01)

(58) Field of Classification Search
CPC ..... H04L 47/263; H04L 47/33; H04L 47/22; H04L 47/225
See application file for complete search history.

(56) References Cited

U.S. PATENT DOCUMENTS

| 5,781,532 | A | 7/1998 | Watt | |
| 6,405,256 | B1 * | 6/2002 | Lin | H04L 29/06 709/201 |
| 2003/0012138 | A1 | 1/2003 | Abdelilah | |
| 2003/0156542 | A1 | 8/2003 | Connor | |
| 2007/0127378 | A1 | 6/2007 | Yang | |
| 2010/0034091 | A1 | 2/2010 | Hiertz | |

OTHER PUBLICATIONS

R. Mandeville, "*Benchmarking Terminology for LAN Switching Devices*," European Network Laboratories, RFC 2285, 25 pgs., Feb. 1998.
S. Bohacek, "*Stability of Hop-by-Hop Congestion Control*," Proceedings of the 39th IEEE Conference on Decision and Control, Sydney, Australia, pp. 67-72, Dec. 2000.

\* cited by examiner

*Primary Examiner* — Hoon J Chung
(74) *Attorney, Agent, or Firm* — Baker Botts L.L.P.

(57) ABSTRACT

A distributed, bi-directional congestion control and starvation avoidance system for wireless mesh networks. In particular implementations, the nodes of the wireless mesh network monitor their respective local buffers for traffic load, and signal upstream and downstream nodes in response to detected congestion or excess capacity to dynamically allocate transmit capacity between neighboring nodes. Particular implementations are capable of mitigating congestion and preventing starvation in a fully distributed, low-overhead, scalable and efficient manner.

20 Claims, 6 Drawing Sheets

DISTRIBUTED BI-DIRECTIONAL FLOW CONTROL IN WIRELESS MESH NETWORKS

CROSS REFERENCE TO RELATED APPLICATION

This application is a continuation of U.S. application Ser. No. 12/114,822 filed May 5, 2008 and entitled "Distributed Bi-Directional Flow Control In Wireless Mesh Networks".

TECHNICAL FIELD

The present disclosure relates generally to wireless networks and congestion control.

BACKGROUND

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timeliness and productivity of their communications and applications. In doing so, these users require greater visibility, security, management, and performance from their network.

Flow control in mesh networks is a difficult problem because of the complexity of the interacting traffic patterns. This is true even for simple tree-shaped mesh networks served by a single root node in that inbound and outbound flows of at least four different priority levels interact with each other. The flow control problem is further aggravated by the use of the Carrier Sense Multiple Access (CSMA) medium access techniques in many wireless networks, especially in cases of imperfect Radio Frequency (RF) coupling between the nodes sharing the same channel: high traffic loads generated by some nodes will prevent successful reception of other traffic at their neighbour nodes. This effect is called starvation. Although it is most prevalent in single RF channel systems, starvation can also appear in multi-channel RF systems.

In a multi-hop network, intermediate nodes that carry traffic for other nodes may observe their buffers being filled up quickly, which may result in buffer overflow and packet losses. Flow control and congestion control have always been important services available over the Internet. They prevent sending nodes from overwhelming the receiving nodes and avoid grid lock. For instance, Transmission Control Protocol (TCP) has both flow control and congestion control. However, being an end-to-end protocol, TCP has very coarse timing resolution and a long response time. Thus, TCP's congestion control does not react promptly to local congestion situations. Further, User Data Protocol (UDP) does not have any congestion control mechanism built in, so an external mechanism is required.

Providing congestion control is challenging yet important in a multi-hop wireless environment. First, the wireless medium is a shared resource, and any bandwidth consumed by one node affects the bandwidth available to its neighboring nodes. Second, in a multi-hop mesh network, traffic aggregates at intermediate nodes. If the intermediate nodes experience buffer overflow and start to drop the packets that have been delivered over multiple hops, more bandwidth is wasted. Third, TCP is very sensitive to packet losses and will throttle its congestion window in half upon detection of a single packet loss. Also, without congestion control, a multi-hop wireless network may suffer from congestion collapse, where the end-to-end throughput drops dramatically.

DESCRIPTION OF EXAMPLE EMBODIMENTS

A. Overview

Particular implementations of the present invention are directed to a distributed, bidirectional congestion control mechanism that is applicable to a wide range of mesh network types, including mesh networks that use a shared medium for links between mesh nodes. The congestion control mechanism is able to reduce or prevent congestion, as well as prevent starvation. Particular implementations operate independently from the details of traffic types and traffic flows and are compatible with a variety of power saving schemes. The signalling between nodes can be lightweight and carried efficiently in headers of data frames and/or acknowledgements. The congestion control mechanism can operate on an aggregate or per-traffic-class or per-access-class basis. The effects of the congestion control mechanism can be adjusted by means of parameters that can be set for the whole network or for select individual nodes.

In particular implementations, the congestion control mechanism described herein is effected on a distributed basis in that each of the nodes of the mesh network executes processes directed to signalling other nodes, as well as processing received signals, to modulate transmit rates in a manner that alleviates congestion and prevents starvation. In a unified architecture, addressing this problem in a centralized manner—i.e., at the controller level—may at first glance appear attractive: the central controller knows all the flows and loads, and hence could instruct the nodes as to how to adjust their transmit rates in order to achieve the best overall network performance. However, the occurrence of congestion and starvation negatively affects the ability of the controller to get an accurate picture of the flows from different nodes in the network, which may prevent the timely delivery of flow control instructions to the nodes. Therefore, a distributed flow control design may be desirable; one such design is presented herewith.

B. Example Wireless Mesh Network System Architecture

B.1. Network Topology

Figure 1:
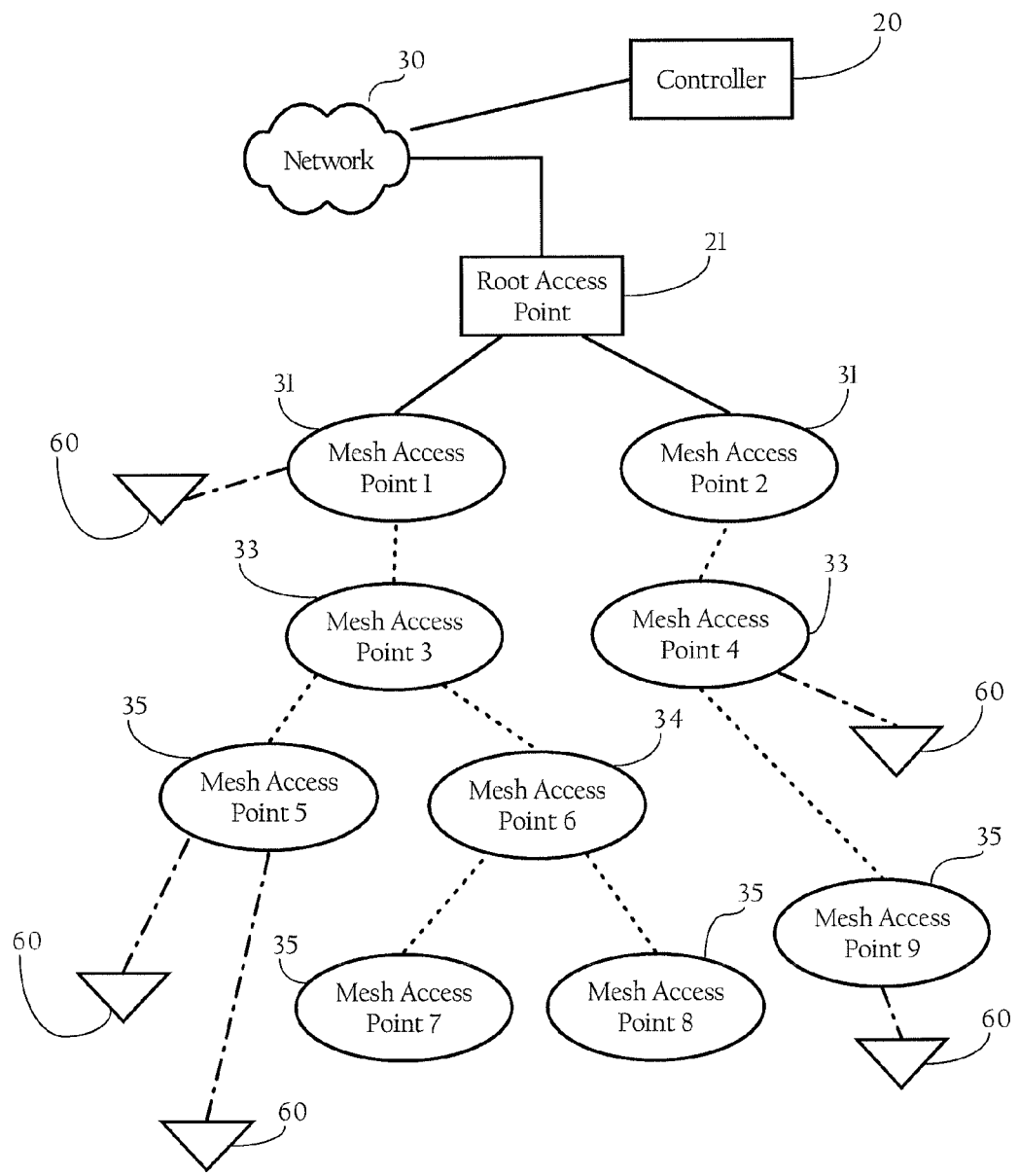
FIG. 1 illustrates an example topological diagram of a hierarchical wireless mesh network.

FIG. 1 illustrates a wireless mesh network according to one implementation of the present invention. In one implementation, the wireless mesh network includes a wireless mesh controller 20, a root access point 21, and a plurality of child wireless mesh access points. In one implementation, the mesh access points are logically arranged in a hierarchy for purposes of routing traffic to the root access point (RAP) and on to a network. In one implementation, this hierarchy can be either dynamically configured and shifted based on the discovery of wireless management messages between wireless mesh access points, or can be statically configured.

In one implementation, a hierarchical architectural overlay is imposed on the mesh network of routing nodes to create a first transmission direction towards leaf routing nodes 35, and a second transmission direction toward the root access point 21. For example, in the hierarchical mesh network illustrated in FIG. 1, a first hop mesh access point 31 is the parent of intermediate mesh access point 33. In addition, intermediate mesh access points 33 and 34 are the parent to leaf mesh access point 35. In one implementation, this hierarchical relationship is used in routing packets between wireless clients 60, or between wireless clients 60 and network 30. Of course, a variety of wireless mesh network configurations are possible including non-hierarchical configurations and hierarchical configurations with a fewer or greater number of hierarchical tree structures.

The mesh access points in the mesh network, in one implementation, generally include one radio, operating in a first frequency band, and associated wireless communication functionality to communicate with other mesh access points to thereby implement the wireless backbone, as discussed more fully below. All or a subset of the mesh access points, in one implementation, also include an additional radio, operating in a second, non-interfering frequency band, and other wireless communication functionality to establish and maintain wireless connections with mobile stations, such as wireless client 60. For example, in 802.11 wireless networks, the backbone radios on the wireless routing nodes may transmit wireless packets between each other using the IEEE 802.11a protocol defined for the 5 GHz band, while the second radio on each mesh access point may interact with wireless clients in the 2.4 GHz band (IEEE 802.11b/g). Of course, this relation can also be reversed with backhaul traffic using the IEEE 802.11b/g frequency band, and client traffic using the IEEE 802.11a band. In addition, the mesh access points may include only a single radio or additional radios.

In one implementation, some wireless mesh networks can include a controller and a plurality of mesh access points that are configured into one or more routing and control hierarchies based on automatic neighbor and route discovery protocols. In some environments, individual mesh access points automatically discover their neighbors and configure hierarchical routing configurations by selecting parent nodes based on a variety of factors. Mesh access points, in some systems, connect to a wireless controller through one or more parent nodes in the routing hierarchy.

B.2. Central Controller

Figure 2A:
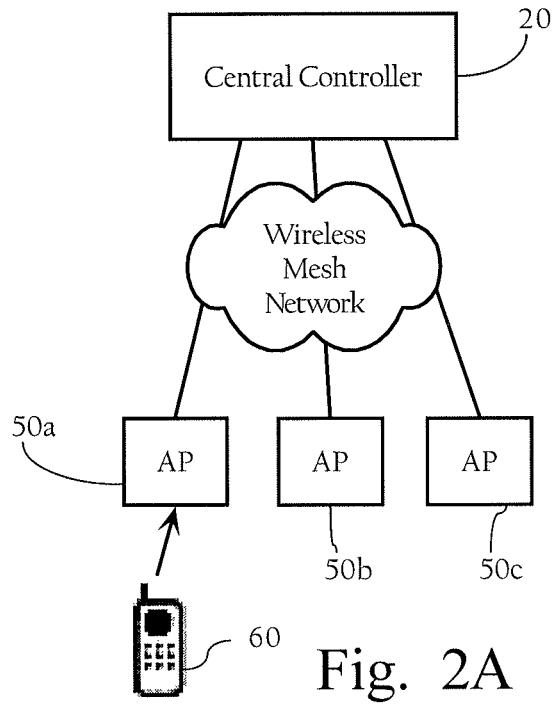
FIG. 2A illustrates a schematic, logical view of the hierarchical relationship between mesh access points and a central controller.

FIG. 2A illustrates the logical relationship between mesh access points and controller 20 relative to wireless clients, according to one possible implementation of the invention. In one implementation, the mesh access points, in connection with the controller 20, implement a hierarchical processing scheme for management of wireless connections with clients 60. For example, each mesh access point may be configured to autonomously implement time-critical link layer functions (such as transmitting acknowledgements), while also encapsulating and forwarding wireless management frames (e.g., association requests, etc.) and other client traffic to controller 20 for processing. The encapsulated frames may traverse one or more intermediate mesh access points in the mesh hierarchy as indicated by FIG. 2A.

In other implementations, the controller 20 may be implemented as a wireless domain management server (WDMS). If the controller 20 is implemented as a WDMS, the functionality implemented by the mesh access points may comprise the full range of processing functions for wireless data frames as well wireless management frames (e.g., association requests, etc.) and other client traffic. Of course, a variety of other mesh routing and control schemes can be used in connection with the real-time transport protocol described herein.

Figure 2B:
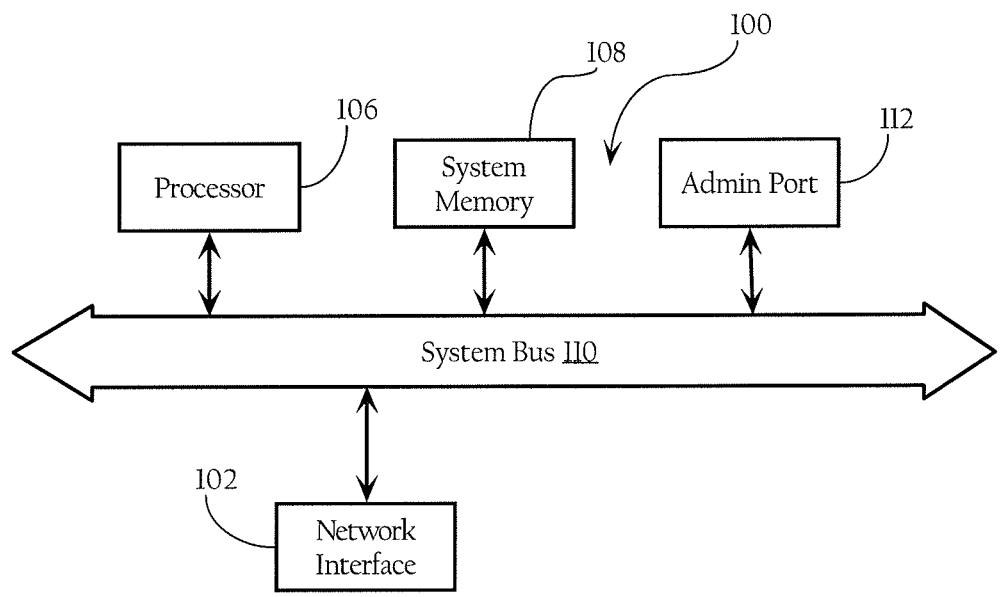
FIG. 2B illustrates an example hardware system, which may be used to implement a central controller.

FIG. 2B illustrates an example hardware system 100, which may be used to implement a controller 20. As FIG. 2B shows, in one implementation, the central controller 20 includes a network interface 102. Controller 20, in one implementation, further comprises a processor 106, a memory 108, one or more software modules stored in memory 108, including instructions for performing the functions described herein, and a system bus 110 operationally connecting these components. The central control elements may optionally include an administrative port 112 allowing for administrative access for such purposes as configuration and diagnostic access.

B.3. Wireless Mesh Access Point

Figure 3:
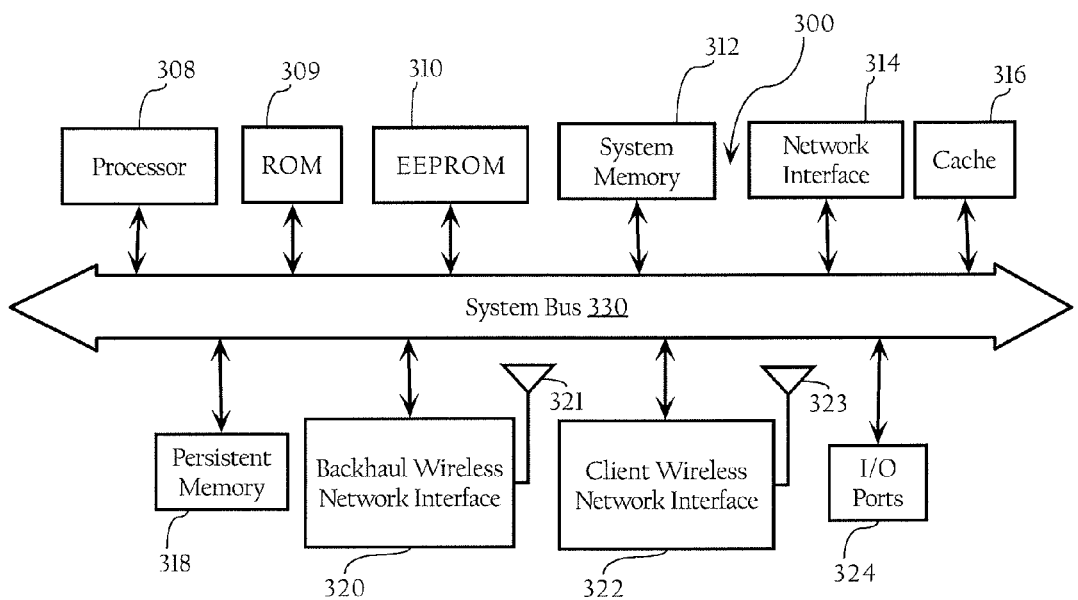
FIG. 3 illustrates for didactic purposes a hardware system, which may be used to implement a mesh access point.

FIG. 3 illustrates for didactic purposes a hardware system, which may be used to implement a wireless mesh access point in a wireless mesh network. In one implementation, the wireless mesh access point 300 comprises a processor 308, a read-only memory (ROM) 309, and an electronically erasable read-only memory (EEPROM) 310. The wireless mesh access point 300 may also include one or more of the following: a memory 312, a network interface 314 (e.g., an 802.3 interface) for communication with a LAN, a cache 316 for storing WLAN information, and a persistent memory 318. The wireless mesh access point 300 may also include a backhaul wireless network interface 320 having an antenna 321. Backhaul wireless network interface 320 is configured to transmit and receive messages to/from one or more other wireless mesh access points in a mesh network. The wireless mesh access point 300 may also include a client wireless network interface 322 (e.g., an IEEE 802.11 WLAN interface) having an antenna 323. Client wireless network interface 322 is configured for wireless communication with one or more wireless clients 60. The backhaul wireless network interface 320 and client wireless network interface 322 may be radio interfaces. The wireless mesh access point 300 may also include input/output (I/O) ports 324 and a system bus 330 interconnecting these components.

In some implementations, wireless mesh access point use one or more of the following standards: WiFi/802.11, WiMax/802.16, 2G, 3G, or 4G Wireless, Bluetooth/802.15, Zigbee, or any other suitable wireless communication standards. In one implementation, wireless mesh access point may have a separate access radio, and associated interface components, for communicating with a wireless client or other portable computer. The wireless mesh access points may also include software modules, including Dynamic Host Configuration Protocol (DHCP) clients, transparent bridging, Lightweight Access Point Protocol (LWAPP), Cisco® Discovery Protocol (CDP) modules, wireless access point modules, Simple Network Management Protocol (SNMP) functionality, etc., and device drivers (e.g., network and WLAN interface drivers) stored in persistent memory 318 (e.g., a hard disk drive, flash memory, EEPROM, etc.). At start up, one or more of these software components are loaded into system memory 312 and then accessed and executed by processor 310. In one implementation, the wireless mesh access point 300 includes software or firmware modules for recognizing the reception of network management information and for storing such information in memory (e.g., EEPROM 310).

C. Bi-Directional Congestion Control with Back & Forward Pressure Signaling

Flow control mechanisms may have two main objectives—mitigating or eliminating congestion and preventing starvation. If either of congestion or starvation occurs, communication is impaired and signalling to remedy the cause may possibly become ineffective. Avoiding congestion requires that upstream nodes reduce their traffic loads to a level that comports with the capacity available at the downstream node(s). This can be achieved in a lightweight manner by asserting a back pressure signal in communications between nodes that triggers a preset reaction at the receiver—e.g. to reduce its downstream traffic data rate by some percentage or fixed increment for some time period (a rate adjustment decay time), during which the reduction in data rate is gradually reduced to zero (such that the downstream traffic rate returns to a default rate). By repeating the pressure signal, the sending node can achieve a desired level of flow reduction at its upstream source(s). The percentage or increment amount and the decay time can both be system parameters that allow modification of the upstream flow control behaviour of all network mesh nodes, even individual nodes. Conversely, when a node observes congestion level decreases, allowing it to handle more traffic, it may send a negative backpressure signal allowing the upstream nodes to increase their downstream traffic rates.

Figure 4:
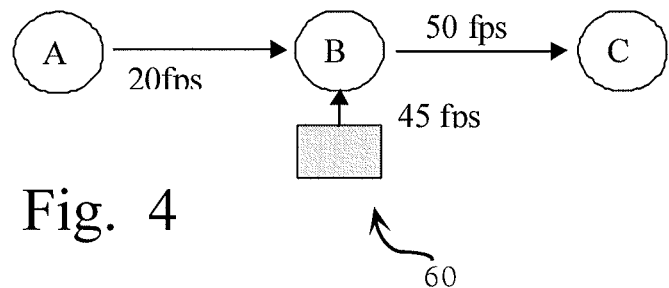
FIG. 4 is a diagram illustrating traffic flows between nodes of a network.

Starvation occurs when one or more nodes in the mesh network prevent other nodes from delivering their traffic to downstream nodes. Referring to FIG. 4, node B will use nearly all of its downstream capacity to service the locally generated traffic sourced from mobile station 99 causing the traffic flow from node A to be starved. Note that this effect is independent of the transport protocol or the medium access protocol used between the nodes. Preventing starvation requires that downstream nodes adjust their own traffic loads so as to leave sufficient capacity to handle traffic from upstream neighbours. This may be possible if the downstream nodes have knowledge of their upstream traffic loads. Thus, preventing or reducing starvation can be achieved by signalling from node A to node B that more (or less) capacity is needed to service node A's traffic load towards node B. One possible mechanism to accomplish this is the complement of the upstream backpressure signal discussed above—i.e., a forward pressure signal. The semantics of this forward pressure mechanism may be similar to that of the backward pressure signals in that positive forward pressure indicates that the upstream node desires to send at an increased data rate, while negative forward pressure indicates that a lower data rate can suffice for the upstream nodes traffic needs. Still further, null back and forward pressure signals may also be asserted to address some situations that may arise in shared access media using collision avoidance schemes. The null pressure signals can be used as a form of heartbeat signal, the absence of which is treated as positive pressure, as discussed below.

In summary, for medium-independent flow control, two, three-valued signals can be used to control traffic flowing through the mesh in the same direction. In the upstream direction, a node may assert positive, null or negative back pressure. In the downstream direction, the node may assert positive, null or negative forward pressure.

C.1. Flow Control and Shared Wireless Media

Figure 6:
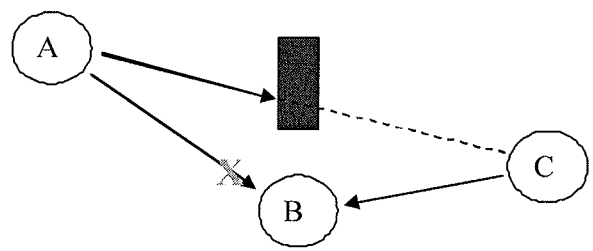
FIG. 6 illustrates an example RF environment that includes a set of nodes in a wireless network.

Forward and back pressure signalling assumes that a channel for the signalling remains available under all circumstances. This is not necessarily true for all networks. For example, in large scale, outdoor mesh networks using a shared medium backhaul, the signalling channel may be unreliable. FIG. 6 illustrates one of the problem cases in shared wireless media. For some reason—such as a blockage by some object—the set of transmissions paths between a group of nodes is not complete: node A can communicate with node B; node B can communicate with node C; however, nodes A and C have no radio connectivity preventing implementation of collision avoidance mechanisms between them. The result is that node A and node C do not coordinate their wireless transmissions which may cause collisions. Depending on the relative signal strengths, either node A's or node C's messages will be overpowered or obscured by the other's signal transmissions, rendering node B unable to recover them. Depending on the type of traffic being carried, the result can be more or less severe starvation of, in this example, the flow between node A and node B.

For example, assume that node A sends a TCP stream to node B and that node B sends a TCP stream to node C. The TCP ACK frames from node C to node A may interfere with the TCP data frames transmitted from node A. Every time that happens, node A will be forced into exponential backoff, increasing the chance that node A's TCP source times out and restarts its flow. Effectively, node A is starved by the excessive activity of node B, which in turn causes significant activity from node C.

This case can be remedied by the downstream flow control described herein: node A can signal to node B that it needs to sink more of node A's traffic. However, here the signalling channel is unreliable and therefore, in the case of shared media, the semantics of the downstream signal can be extended to include the case that the signal is absent (although node A and node B have an established link between them). In one implementation, the back pressure and forward pressure signal information is included in data or acknowledgement frames. If no data is transmitted or acknowledged within a threshold period of time in either the upstream or downstream direction, the nodes can be configured to transmit a wireless frame that includes forward or back pressure signal information. Accordingly, in one possible implementation for shared media downstream flow control, a forward or back pressure signal can explicitly indicate positive, null or negative pressure, while the absence of a forward or back pressure signal for a period of time can be treated as a positive pressure signal.

C.2. Traffic Class Differentiation & Signalling

Figure 5A:
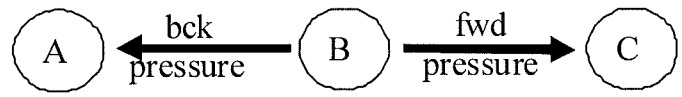
FIGS. 5A and 5B illustrate communication of back and forward pressure signals between nodes of a network.
Figure 5B:
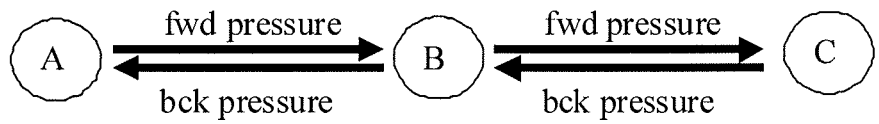

FIGS. 5A and 5B illustrate the pressure signalling directions relative to node B for the transmit direction from node A to node C. As FIG. 5B shows, the same signalling applies to traffic in the same direction at other nodes. Still further, the same signalling scheme applies to traffic transmitted in the opposite direction from node C to node A.

Traffic flows consist of different traffic or access classes with different properties and different rules for forwarding in the nodes of the mesh network. In a typical wireless network deployment, wireless traffic is segregated into access classes, where the classified wireless frames are buffered in queues that correspond to a given access class. The nodes in the mesh can be configured to allocate wireless bandwidth to each of the access classes. The flow controls described herein can be applied to each of the traffic classes separately or on an aggregate basis.

Figure 7:
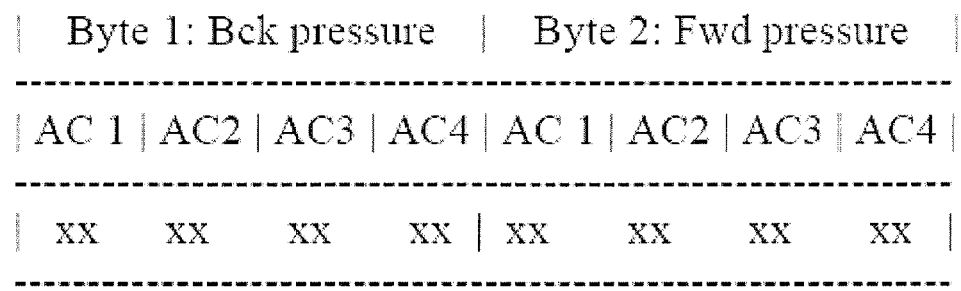
FIG. 7 illustrates an example signaling header and the fields of the signaling header.

Typically, separate instances of signalling for each class are an inefficient mechanism. Similarly, using separate control frames for flow control signalling is not efficient either. Instead, adding the necessary signalling bits to the header of data or acknowledgement frames achieves efficiency, as well as timeliness: if flow control is needed, traffic loads will be high and thus there will be ample opportunity for carrying these signals to the destinations. FIG. 7 provides an example of the format of the fields for a signalling header that may be appended or inserted in wireless frames transmitted between nodes. The values (xx) for each access class field can be set to 00 to indicate a null value, 01 to indicate a positive pressure, and 11 to indicate negative pressure. Of course, other signalling value conventions can be used. The back pressure byte refers to traffic flowing in the opposite direction (e.g. from the receiver of the signal to the source), whereas the forward pressure signal refers to traffic flowing in the same direction as the signal. As discussed above, there may be cases that require an empty data frame to be sent, just to carry the back or forward pressure signals to a next hop node. The signalling header discussed above can be made compatible with the IEEE 802.11 WLAN standard. The signalling header field in the data frames, for example, can be defined as a vendor specific version of the optional Congestion Control scheme defined by the draft IEEE 802.11 Mesh Amendment (802.11 TGs).

C.3. Individual Mesh Node Behaviour

Figure 8:
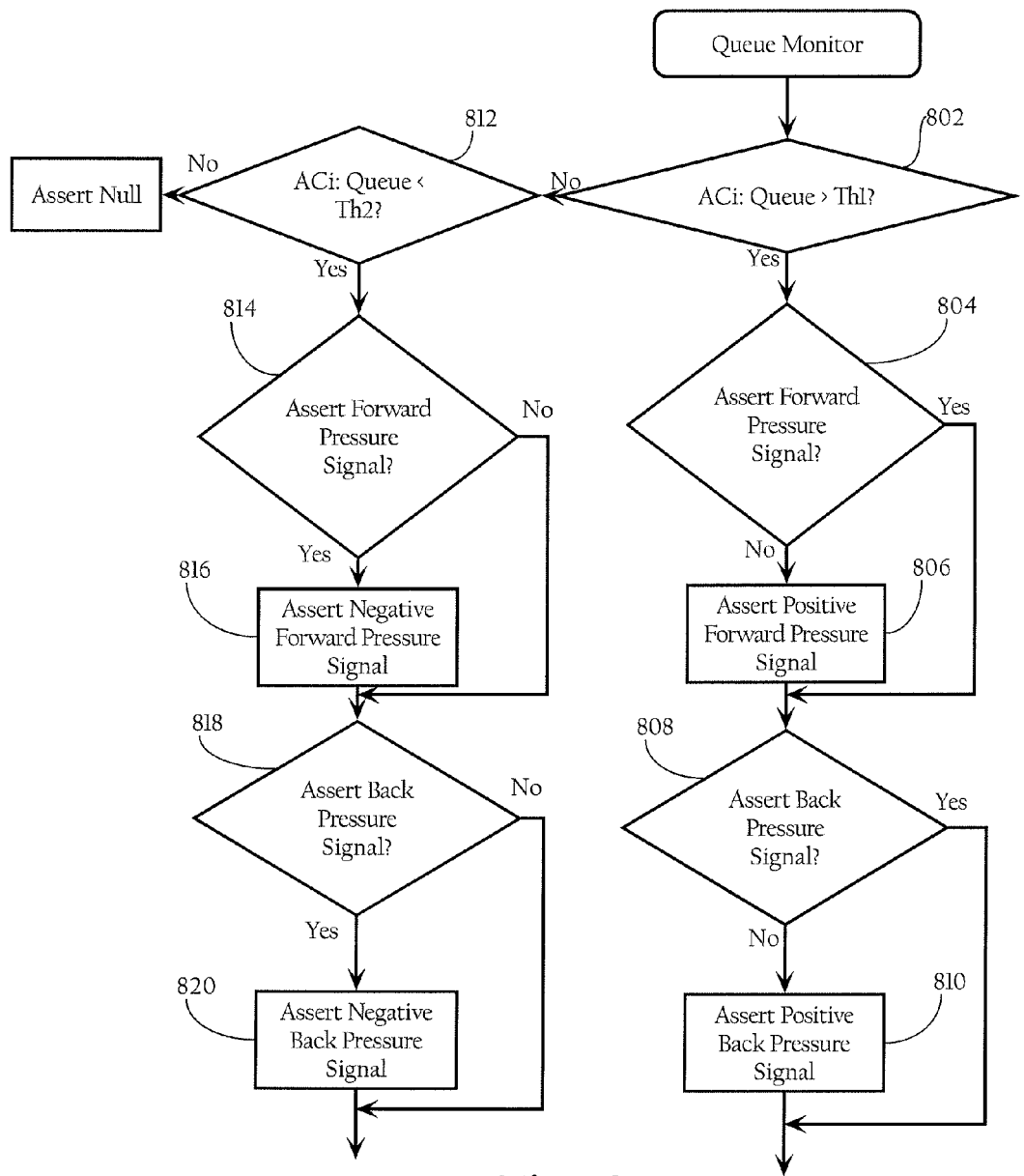
FIGS. 8 and 9 are flow chart diagrams illustrating example methods directed to a bi-directional, congestion control scheme.

Each of the wireless mesh access points in the mesh network asserts back and forward pressure signals with the immediate upstream and downstream nodes, and responds to back and forward pressure signals of these nodes, to achieve a distributed, bi-directional congestion control and starvation prevention mechanism. In addition, the wireless mesh access points buffer received packets in transmit queues. The transmit queues may correspond to access classes, as discussed above. The transmit queues may also correspond to other nodes in the mesh network, such as a parent mesh node or a child routing node. In other implementations, a given node can maintain access class transmit queues for each of the mesh routing nodes with which it is associated. Further, a node may associate a transmit rate (bits per second) or a medium access time to each of the transmit queues to allocate the capacity of the radio interface. FIG. 8 illustrates an example queue monitoring process where a wireless mesh access point may assert back and forward pressure signals based on observed transmit queue depth corresponding to its access class transmit queues. The process may examine the transmit queues in both transmission directions—i.e., upwards to the root and downwards to one or more child nodes. The process may compare the current depth of a queue to one or more threshold levels and set back and forward pressure values in a pressure signalling table or other data structure. A separate transmit process can access this data structure when composing frames for transmission to include the latest signalling values in transmitted frames. In some implementations, forward and back pressure signalling may be different for the next hop nodes associated with a given node. For example, as discussed below, a node may assert back pressure signals to two child nodes in response to receipt of a forward pressure signal of a third child node. The transmit process may include the forward and back pressure signal information in every transmitted frame or insert it in select frames at some desired time interval. The queue monitoring process may be executed periodically, such as every 100 milliseconds or at some other configurable time interval.

According to the implementation illustrated in FIG. 8, a queue monitoring process may compare the current number of frames buffered in a transmit queue relative to an upper threshold (802) and a lower threshold (812). If the queue depth is between these thresholds, the queue monitoring process may set the forward and back pressure signal values for the access class queue (ACi) to null. Otherwise, if the queue depth exceeds the upper threshold (802), the queue monitoring process then implements additional decisional logic to conditionally set the forward and back pressure signal values (804, 806, 808 and 810). The decisional logic that determines when the forward and/or back pressure signals should be set to positive can vary considerably based on a variety of engineering considerations and design goals. In a particular implementation, for example, the decisional logic may be configured such that, upon the first interval where congestion is detected, the forward pressure signal value is set to positive, while the back pressure signal remains null. If after a second or other succeeding time interval, congestion remains, the forward pressure signal may be set to null or remain positive, while the back pressure signal may be set to positive. Other decisional logic and/or the parameter values used by the decisional logic can be user configurable.

Additionally, as discussed above, a node may also assert negative forward and back pressure signals if excess capacity is observed. For example, if the queue monitoring process observes that the queue depth is below the lower threshold value (812), the process may execute decisional logic to determine whether to assert negative forward pressure and/or back pressure signals (814, 816, 818 and 820). The decisional logic that determines when the forward and/or back pressure signals should be set to negative can vary considerably based on a variety of engineering considerations and design goals. In a particular implementation, for example, the decisional logic may be configured such that, upon the first interval where low traffic load is detected, the back pressure signal value is set to negative, while the forward pressure signal remains null. If after a second or other succeeding time interval, low traffic load remains, the back pressure signal may be again set to negative, while the forward pressure signal, this time, may also be set to negative. Other decisional logic and/or the parameter values used by the decisional logic can be user configurable.

The central controller 20 may be configured with policy-based parameters that are passed to the mesh access points of the mesh network to control how the mesh access points respond to back and forward pressure signals. In one implementation, the parameters include a percentage rate adjustment value (D) and an adjustment decay time (Td). The percentage rate adjustment value (D) is a parameter indicating the percentage of the current rate that a node should increment or decrement in response to forward or back pressure signals. The adjustment decay time (Td) indicates the time during which the adjustment should decay to return the transmit rate to its configured default rate.

The following provides an example rule set implemented by the wireless mesh access points in response to back and forward pressure signals.

Rule 1: If no backpressure signal is received, a node treats this as a null backpressure signal for all access classes.

Rule 2: If a null backpressure signal is received for a given access class, no rate change to the downstream traffic for that access class is needed.

Rule 3: If a positive backpressure signal for a given access class is received, reduce the transmit rate for that access class towards the sender of the signal by D %.

Rule 4: If a negative backpressure signal is received for a given access class, increase the transmit rate for that class towards the sender by D %.

Rule 5: If no forward pressure signal is received within a threshold period, treat this as a positive forward pressure signal for all classes.

Rule 6: If a null forward pressure signal is received for a given access class, no change to the downstream transmit rate for that class is needed.

Rule 7: If a positive forward pressure signal for a given access class is received, the effect depends on the traffic flows at receiver node R. If node R has a high level of downstream traffic for that class, R reduces its downstream traffic for that class.

Rule 8: If a negative forward pressure signal is received for a given access class, increase the downstream traffic rate for that class by D %.

Figure 9:
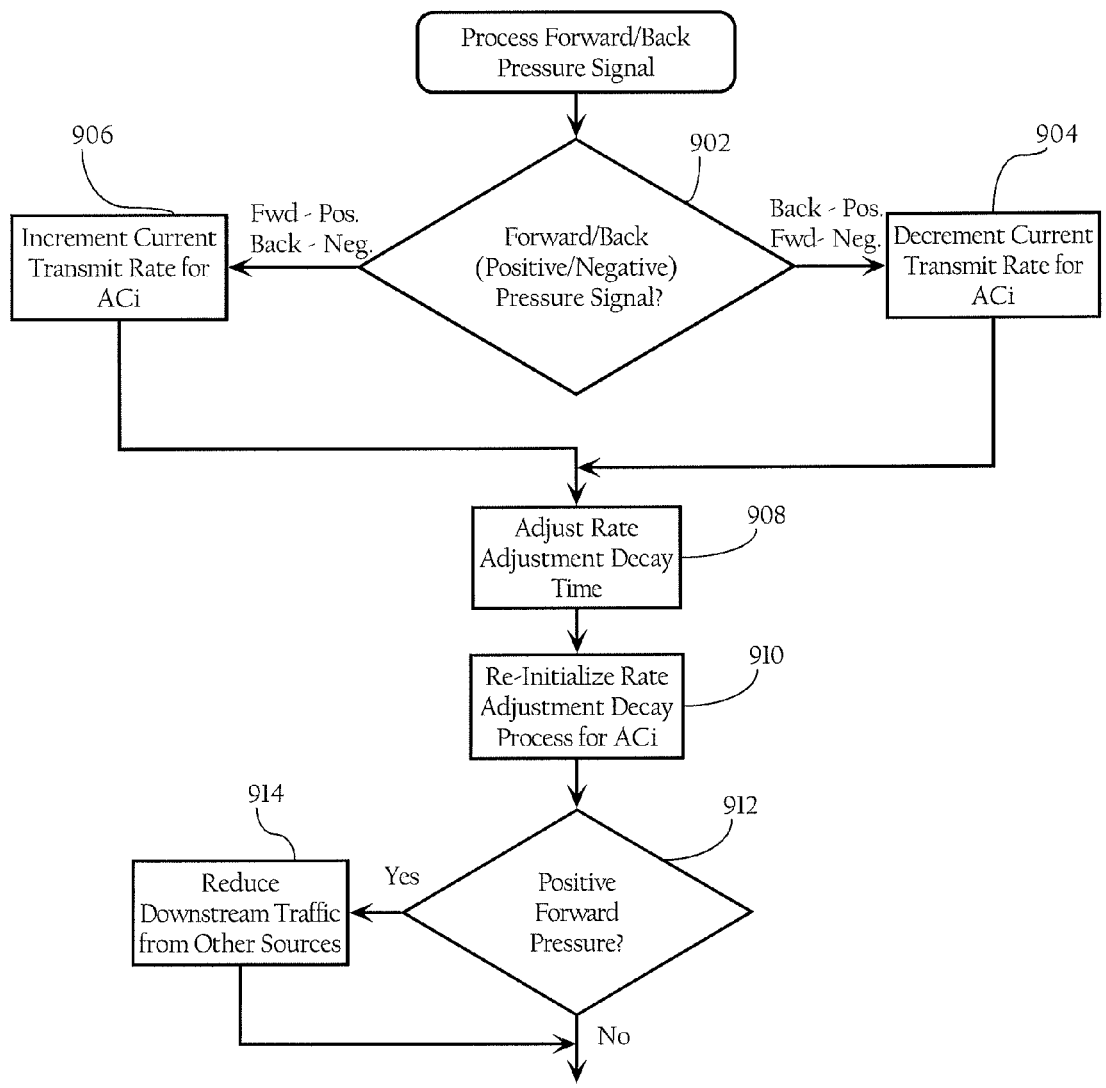

FIG. 9 is a flow diagram illustrating one example implementation of the rule set provided above. As FIG. 9 shows, positive forward pressure and negative back pressure signals cause a node to increase the transmit rate for the access class (902, 906), while negative forward pressure and positive back pressure signals cause a node to decrement the transmit rate for the access class (902, 904). In one implementation, an administrator or a default configuration can specify a minimum and maximum rates that would bound the transmit rate adjustments. When a transmit rate is adjusted, the node also adjusts the rate adjustment decay time (908). In one implementation, the node increments the rate adjustment decay time by Td. For example, the first time a transmit rate were adjusted, the rate decay time would be set to a value equal to Td. If the transmit rate for the same access class where again adjusted within the first Td time interval, the rate adjustment decay time would be incremented by Td such that the new rate adjustment decay time equalled Td, plus the current rate adjustment decay time. In one implementation, the rate adjustment decay time is always incremented by Td regardless of whether the previous transmit rate adjustment is opposite to the current rate adjustment (e.g., current rate adjustment increases rate, while previous rate adjustment decreased rate). In other implementations, the rate adjustment decay time may be re-initialized to Td, if the preceding rate adjustment was in the opposite direction of the current rate adjustment.

After the rate adjustment decay time is set, the node then reinitializes the rate adjustment decay process for the access class (910). As indicated above, if a node receives a positive forward pressure signal (912), the node may attempt to reduce downstream traffic for that access class attributable to other sources (914). For upstream mesh nodes other than the signalling node, the node receiving the forward pressure signal may assert positive back pressure signals to one or more upstream mesh nodes to cause them to reduce their downstream transmit rates for that access class. The sources and sinks of wireless traffic may be local to a given mesh node (see FIG. 4, above). Where this is the case, the reductions and increases signalled by the back and forward pressure signals may apply to these sources and sinks, as well as to the mesh nodes. For wireless clients that are the source of traffic, the node may implement link layer, transport layer or other flow control mechanisms to cause one or more wireless clients to reduce their transmission rates. For TCP traffic, for example, the node may adjust a TCP window size, or delay TCP acknowledgments.

The rate adjustment decay process may apply any suitable algorithm to return the transmit rate to its default or configured rate. For example, the rate adjustment decay process may apply a linear function or an exponential function that gradually increases or decreases the current transmit rate for an access class as required to return the transmit rate to the configured rate within the rate adjustment time. As discussed above, the rate adjustment time may be reset as new pressure signals are asserted and received.

C.4. Prioritizing Forward Pressure Signals

In a particular implementation, the mesh access point nodes maintain separate transmit queues (per-access-class) for each upstream node with which they are associated. This or other mechanisms allow a rate control mechanism in the mesh access point to arbitrate among the queues to allocate downstream bandwidth to the upstream nodes. A downstream node may receive requests for more capacity in the form of positive forward pressure signals from multiple upstream nodes. It is possible, especially in case of the nodes close to the root of a mesh tree, that these multiple positive forward pressure signals, if they are all to be granted immediately, would require a combined capacity exceeding the available capacity of the downstream node to which these signals are directed. One solution to this problem is to adjust the capacity increase (more precisely, the fraction or percentage of this increase) per upstream node so that the combined increased flows do not exceed the downstream node's overall traffic processing capacity.

In some implementations, each upstream node that has sent a positive forward pressure signal could be entitled to an equal share of this flow increase. However, that scheme would require that, in one implementation, the traffic rate adjustment value, D, be variable; in particular, in such an implementation, D would need to be dependent on the exact network topology (e.g., how many child nodes each mesh node has) and possibly other mesh network design and/or implementation details. Alternatively, in a different implementation, if D is to be a constant value (% or fraction of a node's capacity), then conservative assumptions would need to be made, thereby necessitating that the capacity increases for the neighboring nodes requesting more capacity would have to be granted in chunks possibly much smaller than what would be desirable.

Still further, not all requests for more capacity (i.e., not all positive forward pressures) are equally important, or for that matter equally old (in scenarios where not every request for more capacity can be immediately granted). One would want to give higher priority to more important requests. Therefore, an optional additional mechanism for dynamic flow control would be that, in case of multiple positive pressure signals received at a downstream node, the requests that those signals represent be appropriately prioritized. For instance, in one implementation, at the modest overhead communication cost of only two extra bits, four priority classes can be defined, and each positive forward pressure signal can include a 2-bit value indicating to which of these four priority classes this particular request belongs.

Given the goal of starvation avoidance, and that a node's request for more capacity would get starved if this request keeps being considered of low priority forever, one sub-mechanism that can be built into the prioritization scheme outlined above is that of request aging. In a particular implementation, a system-wide aging policy could be defined that specifies how a request's priority class is to be increased if the request from a node in a particular class has not been granted for some time period. An appropriate aging policy, in general, may depend on many factors and moreover not all node request priorities need to age according to the same formula.

In summary, the purpose and benefits of augmenting the forward signalling based starvation avoidance mechanism are two-fold: 1) In situations where not all requests for more capacity can be simultaneously granted, prioritizing forward pressure requests can help an overburdened downstream node intelligently decide which requests for more capacity to grant at a given time; and 2) One of the factors or parameters that determines the priority class of a forward pressure request is that due to aging, that is, it is based on for how long an upstream node has been waiting for its request for more capacity to be granted. Together with other parameters, such as the load size, this aging parameter can be combined into a single priority metric.

One example design with low overhead is to have four distinct priority classes, i.e., every possible combination of the aging parameter value, load size, node's type/class and possibly other system parameters, would be uniquely mapped into one of the four available priority classes. The downstream node first grants all the capacity increase requests belonging to the top priority class. After all requests in the first priority class have been satisfied, if there is still any downstream transmit capacity left, requests from the next priority class are satisfied. Naturally, ties may arise where not every request from the same class can be granted in a given round; in that scenario, the ties can either be broken arbitrarily or according to some pre-specified scheme. For example, tie-breaking could be based on the ordering of mesh nodes' indices. Those requests that have not been satisfied in the current round stand a better chance of being granted the next time around, as (due to aging) their priority class may go up. In general, such an aging policy guarantees that a positive pressure request, after each time interval during which it has not been granted, may either go up or else stay the same, but it cannot ever go down in priority. In particular, such aging mechanism guarantees that each request's priority, after some number of time intervals, will either get granted or else reach the top priority class. In other words, any such aging mechanism may or may not always be able to adequately alleviate congestion, but (assuming the tie-breaking sub-mechanism for the requests in the same priority class is fair), it can be guaranteed that it would ensure preventing starvation.

Still further, a similar prioritization can also be applied to negative (or null) forward signals. Clearly, the two situations (namely, a request for more capacity that will be required versus a notification that less capacity would suffice) are not symmetric. However, one modification to the negative forward signal mechanism is to roughly quantify the expected flow decrease. In one implementation, by using the two-bit overhead scenario described above, a receiving node can classify each negative forward signal into one of four classes, depending on how much an upstream node estimates its reduction in traffic sent downstream. For all such notifications belonging to the same class, the downstream node releases an equal fraction of its capacity. Thus released capacity at the downstream node can then be made available for the traffic from those upstream nodes that have sent positive forward signals.

Decreases in capacity allotments to two upstream nodes that have sent negative forward signals belonging to different priority classes would in general be different, thereby reflecting different levels of reduction in the future traffic coming from those two nodes.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. An apparatus comprising:
   one or more processors;
   a memory;
   one or more wireless mesh network interfaces; and
   logic encoded in one or more non-transitory computer-readable media for execution and when executed operable to cause the one or more processors to:
      buffer packets to be transmitted in a downstream direction into a transmit queue maintained in the memory;
      receive a positive forward pressure signal from an upstream node to request an increase in a downstream transmit rate associated with the transmit queue;
      increment, responsive to the positive forward pressure signal, the downstream transmit rate; and
      decay, over an adjustment decay time, adjustments to the downstream transmit rate back to a configured transmit rate.

2. The apparatus of claim 1 wherein the logic is further operable to cause the one or more processors to:
   maintain a plurality of access classes, each access class associated with a priority class identifier;
   receive a positive back pressure signal from a downstream node for an access class;
   decrement, responsive to the positive back pressure signal, the downstream transmit rate of the access class based on the priority class identifier of the access class; and
   determine, based on the priority class identifier, whether the downstream transmit rate of the access class was previously adjusted during the adjustment decay time; and
   conditionally increment a remaining decay time for the access class by a multiple of the adjustment decay time.

3. The apparatus of claim 1 wherein the logic is further operable to cause the one or more processors to:
   receive a negative back pressure signal from a downstream node; and
   increment, responsive to the negative back pressure signal, the downstream transmit rate.

4. The apparatus of claim 1 wherein the logic is further operable to cause the one or more processors to:
   receive a negative forward pressure signal from a downstream node; and
   decrement, responsive to the negative forward pressure signal, the downstream transmit rate.

5. The apparatus of claim 1 wherein the logic is further operable to cause the one or more processors to:
receive forward pressure signals from the upstream node at periodic intervals;
responsive to absence of a forward pressure signal from the upstream node, increment the downstream transmit rate.

6. The apparatus of claim 1 wherein the transmit queue corresponds to an access class of a plurality of access classes.

7. The apparatus of claim 1 wherein the positive forward pressure signal is asserted in frame headers appended to wireless frames transmitted to the downstream node.

8. A method comprising:
buffering packets to be transmitted in a downstream direction into a transmit queue;
receiving a positive forward pressure signal from an upstream node to request an increase in a downstream transmit rate associated with the transmit queue;
incrementing, responsive to the positive forward pressure signal, the downstream transmit rate; and
decaying, over an adjustment decay time, adjustments to the downstream transmit rate back to a configured transmit rate.

9. The method of claim 8 further comprising:
maintaining a plurality of access classes, each access class associated with a priority class identifier;
receiving a positive back pressure signal from a downstream node for an access class;
decrementing, responsive to the positive back pressure signal, the downstream transmit rate of the access class based on the priority class identifier of the access class; and
determining, based on the priority class identifier, whether the downstream transmit rate of the access class was previously adjusted during the adjustment decay time; and
conditionally incrementing a remaining decay time for the access class by a multiple of the adjustment decay time.

10. The method of claim 8 further comprising:
receiving a negative back pressure signal from a downstream node; and
incrementing, responsive to the negative back pressure signal, the downstream transmit rate.

11. The method of claim 8 further comprising:
receiving a negative forward pressure signal from a downstream node; and
decrementing, responsive to the negative forward pressure signal, the downstream transmit rate.

12. The method of claim 8 further comprising:
receiving forward pressure signals from the upstream node at periodic intervals;
responsive to absence of a forward pressure signal from the upstream node, incrementing the downstream transmit rate.

13. The method of claim 8 wherein the transmit queue corresponds to an access class of a plurality of access classes.

14. The method of claim 8 wherein the positive forward pressure signal is asserted in frame headers appended to wireless frames transmitted to the downstream node.

15. Logic encoded in one or more non-transitory computer readable media for execution and when executed operable to:
buffer packets to be transmitted in a downstream direction into a transmit queue maintained in the memory;
receive a positive forward pressure signal from an upstream node to request an increase in a downstream transmit rate associated with the transmit queue;
increment, responsive to the positive forward pressure signal, the downstream transmit rate; and
decay, over an adjustment decay time, adjustments to the downstream transmit rate back to a configured transmit rate.

16. The logic of claim 15 wherein the logic is further operable to cause the one or more processors to:
maintain a plurality of access classes, each access class associated with a priority class identifier;
receive a positive back pressure signal from a downstream node for an access class;
decrement, responsive to the positive back pressure signal, the downstream transmit rate of the access class based on the priority class identifier of the access class; and
determine, based on the priority class identifier, whether the downstream transmit rate of the access class was previously adjusted during the adjustment decay time; and
conditionally increment a remaining decay time for the access class by a multiple of the adjustment decay time.

17. The logic of claim 15 wherein the logic is further operable to cause the one or more processors to:
receive a negative back pressure signal from a downstream node; and
increment, responsive to the negative back pressure signal, the downstream transmit rate.

18. The logic of claim 15 wherein the logic is further operable to cause the one or more processors to:
receive a negative forward pressure signal from a downstream node; and
decrement, responsive to the negative forward pressure signal, the downstream transmit rate.

19. The logic of claim 15 wherein the logic is further operable to cause the one or more processors to:
receive forward pressure signals from the upstream node at periodic intervals;
responsive to absence of a forward pressure signal from the upstream node, increment the downstream transmit rate.

20. The logic of claim 15 wherein the positive forward pressure signal is asserted in frame headers appended to wireless frames transmitted to the downstream node.

* * * * *